(12) United States Patent
Michel et al.

(10) Patent No.: US 12,403,700 B2
(45) Date of Patent: Sep. 2, 2025

(54) REPROCESSING OF A REPLACEABLE SUPPLY COMPONENT

(71) Applicant: HEWLETT-PACKARD DEVELOPMENT COMPANY, L.P., Spring, TX (US)

(72) Inventors: Kyle Michel, Vancouver, WA (US); Laurent Pizot, Vancouver, WA (US); Kyle Mannari, Vancouver, WA (US); Elijah Houle, Vancouver, WA (US); Honee L Mesa, Boise, ID (US); Teresa M O'Keeffe, Boise, ID (US); Lee Jackson, Vancouver, WA (US); Gabriel Scott McDaniel, Boise, ID (US); Steven T Castle, Corvallis, OR (US); Paul L Jeran, Boise, ID (US); David B Novak, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 144 days.

(21) Appl. No.: 18/276,570

(22) PCT Filed: Feb. 12, 2021

(86) PCT No.: PCT/US2021/017886
§ 371 (c)(1),
(2) Date: Aug. 9, 2023

(87) PCT Pub. No.: WO2022/173442
PCT Pub. Date: Aug. 18, 2022

(65) Prior Publication Data
US 2024/0123735 A1   Apr. 18, 2024

(51) Int. Cl.
*G06F 21/44* (2013.01)
*B41J 2/175* (2006.01)
(Continued)

(52) U.S. Cl.
CPC ....... *B41J 2/17546* (2013.01); *B41J 2/17559* (2013.01); *G06F 21/44* (2013.01);
(Continued)

(58) Field of Classification Search
CPC .......... G03G 15/0863; G03G 21/1878; G03G 21/1882; G06F 21/44; G06F 21/45; G06F 2221/2129; B41J 2/17546; B41J 2/17559
(Continued)

(56) References Cited

U.S. PATENT DOCUMENTS

| 6,678,482 B2 * | 1/2004 | Masuda ............. G03G 15/0855 399/84 |
| 6,882,810 B2 | 4/2005 | Karagiannis et al. |

(Continued)

FOREIGN PATENT DOCUMENTS

WO   2020/022583 A1   1/2020

*Primary Examiner* — Hoan H Tran
(74) *Attorney, Agent, or Firm* — Michael Dryja (57) ABSTRACT

Reprocessing of a replaceable supply component may include receiving from an encoding device and using an interface communicatively coupled to the encoding device, a request blob to reprocess a replaceable supply component. The method may include in response to cryptographically verifying the request blob, extracting from the request blob, a supply identifier and raw supply data. The method further includes using the supply identifier and raw supply data, generating a reprocess structure to append or amend original manufacturing data for the replaceable supply component, and providing a response blob to the encoding device, to designate the replaceable supply component as a reprocessed supply component.

15 Claims, 4 Drawing Sheets

(51) Int. Cl.
  *G06F 21/45* (2013.01)
  *G06F 21/30* (2013.01)
(52) U.S. Cl.
  CPC ............ *G06F 21/45* (2013.01); *G06F 21/305* (2013.01); *G06F 2221/2129* (2013.01)
(58) Field of Classification Search
  USPC ........................................................ 399/109
  See application file for complete search history.

(56) References Cited

U.S. PATENT DOCUMENTS

| | | |
|---|---|---|
| 7,246,098 B1 | 7/2007 | Walmsley |
| 9,104,140 B2 | 8/2015 | Ignatchenko et al. |
| 9,519,449 B2 | 12/2016 | Thacker et al. |
| 2011/0205586 A1 | 8/2011 | Takahashi et al. |
| 2013/0227267 A1 | 8/2013 | Senda |
| 2015/0234621 A1 | 8/2015 | Kimura |
| 2015/0278245 A1 | 10/2015 | Sagar et al. |

\* cited by examiner

REPROCESSING OF A REPLACEABLE SUPPLY COMPONENT

BACKGROUND

Various types of devices include replaceable supply components, such as inkjet printhead assemblies, and print material containers for two-dimensional (2D) or three-dimensional (3D) printing devices, for example. Example print material containers include inkjet cartridges, toner cartridges, ink supplies, and build material supplies, among others. In some cases, such supply components include integrated circuits, which may be referred to as chips, to communicate with electronic circuitry of the device in which they are installed. While replaceable supply components may be relevant to printing, replaceable supply components may be used in other contexts, such as in the field of biomedical devices for testing fluids and fluid dispensing and/or other material dispensing devices, such as filtered-water dispensers in a refrigerator.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

It may be desirable to enable the reprocessing of computing supplies in a way that is secure, manageable for tracking and billing, and maintains security and authentication standards. As used herein, a reprocessed computing supply refers to or includes a computing supply that was previously used and has been restored, refilled, or otherwise made available for use again. As a non-limiting example, a reprocessed computing supply may include a print cartridge that has been refilled such that the cartridge may be used again rather than being disposed of. A computing supply may be referred to herein as a supply component, as well as a replaceable supply component.

Previously, computing supplies that were reprocessed were not reprocessed in a manner that is secure, manageable for tracking and billing, and in a manner that maintains security and authentication standards. For instance, such reprocessed computing supplies were not equipped with a consumables management feature, resulting in an inability to reset ink levels or toner gas gauges. Similarly, third party chips often use auto-resetting chips or other solutions that may not be compatible with the original manufacturer's authentication solutions and may expose the computing supply to security vulnerabilities.

Reprocessing of a replaceable supply component, in accordance with the present disclosure, allows for secure reprocessing of a computing supply (e.g., a supply component). The present disclosure describes various components and means for secure reading and writing to a chip of the supply component, as well as a portal that accepts, processes and responds with new data to enable the reprocessing of the supply component. Additionally, the present disclosure describes various aspects of chip data partitioning, data management, and authentication to enhance security. Using this approach, a manufacturer can augment data on the original supply component chip to provide a more feature rich experience.

An example method, consistent with the present disclosure, includes receiving from an encoding device and using an interface communicatively coupled to the encoding device, a request blob to reprocess a replaceable supply component. The method may include in response to cryptographically verifying the request blob, extracting from the request blob, a supply identifier and raw supply data. The method further includes using the supply identifier and raw supply data, generating a reprocess structure to append or amend original manufacturing data for the replaceable supply component, and providing a response blob to the encoding device, to designate the replaceable supply component as a reprocessed supply component.

An example computing device of the present disclosure includes a non-transitory computer-readable storage medium comprising instructions that when executed cause the computing device to perform various actions. For instance, the non-transitory computer-readable storage medium may comprise instructions that when executed cause the computing device to receive from an encoding device, an envelope including a request blob specified using a particular data type, the request blob having a plurality of attributes, each attribute being of the predetermined data type and including a request to reprocess a replaceable supply component. As used herein, an envelope refers to or includes a cryptographic wrapper for a particular block of data. The instructions may cause the computing device to, in response to establishing a key with the encoding device using a key derivation function (KDF) derived key, decrypt the envelope, process the plurality of attributes of the request blob, and generate a reprocess response corresponding to the processed request blob. The instructions may further cause the computing device to generate a response blob including the reprocess response and designating the replaceable supply component as a reprocessed supply component, the response blob having a plurality of attributes, each attribute being of the predetermined data type.

As a further example, a computing device of the present disclosure includes a non-transitory computer-readable storage medium comprising instructions that when executed cause the computing device to receive from an encoding device, a first envelope including a request blob specified using JavaScript Object Notation (JSON), the request blob having a plurality of attributes, each attribute being of a JSON data type and including a request to reprocess a supply component. The non-transitory computer-readable storage medium may also comprise instructions that when executed cause the computing device to process the plurality of attributes of the request blob, and generate a reprocess response corresponding to the processed request blob. The non-transitory computer-readable storage medium may also comprise instructions that when executed cause the computing device to generate a response blob including the reprocess response and designating the supply component as a reprocessed supply component, the response blob having a plurality of attributes, each attribute being of a JSON data type, and cryptographically sign the response blob, and send a second envelope including the response blob to the encoding device.

As described herein, an encoding device may provide a block of supply data to be verified by the exchange service and the exchange service may provide a signed block of data to write back onto the supply component. As used herein, an encoding device refers to or includes a computing device capable of receiving a supply component, and writing data to a non-volatile memory disposed within the supply component. A non-limiting example of an encoding device includes a printer, which is capable of writing data to a print cartridge disposed therein, and of communicating with an exchange service. As used herein, an exchange service refers to or includes a local or cloud-based service capable of receiving requests for reprocessing of a supply component, and responding with data to be written to the non-volatile memory of the supply component. Each binary large object ("blob") of data provided by the encoding device to the exchange service, and provided by the exchange service to the encoding device, may contain a variety of contextual information, supply identifiers, and other data.

Figure 1:
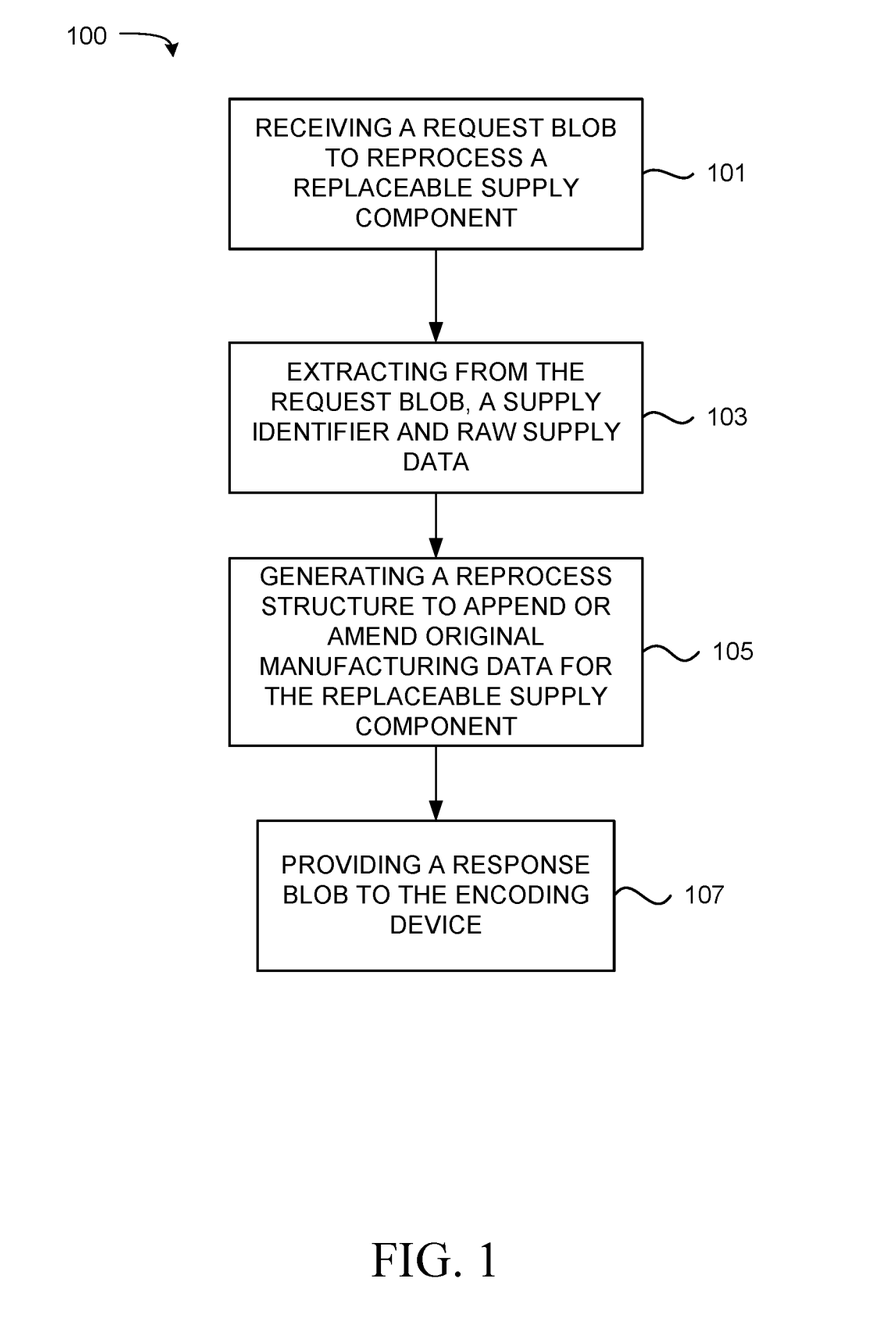
FIG. 1 illustrates an example method for reprocessing of a replaceable supply component, in accordance with the present disclosure.

Turning now to the figures, FIG. 1 illustrates an example method 100 for reprocessing of a replaceable supply component, in accordance with the present disclosure. Although not illustrated in FIG. 1, the method 100 may begin with receipt of a replaceable supply component in an encoding device. The encoding device may be any form of computing device capable of receiving a replaceable supply component and writing data to the replaceable supply component. Non-limiting examples of an encoding device include a printer, a household appliance (such as a refrigerator, a dish washer, a washing machine, etc.) and industrial manufacturing devices. The replaceable supply component may be a device used by the encoding device and capable of refilling and/or re-use. Non-limiting examples of a replaceable supply component include a printer cartridge for ink, toner, and/or 3D printing substrates, filtration systems and/or cleaning systems for household appliances (such as carbon filters, mesh/fiber filters, washing detergent, finishing coatings, etc.), and chemical dispensing cartridges for industrial manufacturing devices. The present disclosure is not limited to the examples described herein, and an encoding device may be any computing device capable of writing data, and a replaceable supply component may be any apparatus capable of coupling with and/or communicating with the encoding device and storing a replaceable supply of any type.

As illustrated, the method 100 may include receiving from an encoding device and using an interface communicatively coupled to the encoding device, a request blob to reprocess a replaceable supply component, at 101. The received request blob may contain supply identifiers, supply data, and any other data that will be used to reprocess the supply component, as discussed further herein.

The encoding device may directly or indirectly provide the request blob to an exchange service. As used herein, an exchange service refers to or includes a remotely-located computing device or a local computing device under control of or otherwise in communication with a remotely-located computing device, and capable of providing to the encoding device, instructions to reprocess a replaceable supply component. The remotely-located computing device may form part of a cloud computing system. In some examples, the encoding device communicates directly with the remotely-located computing device or the local computing device.

The encoding device may communicate with the exchange service via an interface. In some examples, the interface may include a network interface. For example, the interface may include a web browser which connects to a portal. In some examples, the portal may provide access to the exchange service. The portal may be used to provide the original manufacturing data and/or supply data from the encoding device to the exchange service. However, examples are not so limited, and the interface may include a communication interface between local devices or between components of a device, such as a local network connection and/or a locally executed exchange service.

The request blob refers to or includes a data structure passed from the encoding device to the exchange service. The request blob may include identifiers for the supply component and the encoding device, and supply data (also referred to herein as "raw supply data"), among other data. In some examples, the request blob may include a header and a payload, and in some examples may be a JSON web exchange (JWE) data structure. The header may include a description of the cryptographic operations and parameters employed by the blob. In various examples, the header is a JOSE (JSON Object Signing and Encryption) header. The payload of the request blob includes the message to be secured, e.g., the supply component information.

The parameters of the JOSE header may include zip, jti, iat, exp, kid, identityP1, and identityAckP1. The zip header is used for communication optimization, and includes a value of "DEF" indicating that payloads are compressed before encryption. The jti header includes a JWT ID to detect replays. As used herein, a replay refers to or includes a repeated reprocessing request. The iat header includes an "issued at" timestamp. The exp header includes an expiration timestamp. The kid header includes key ID. The identityP1 header includes an indication of Identity Envelope version 1, which reflects a first time registration of the encoding device with the exchange service, or renewal of a registration of the encoding device with the exchange service if an error occurred. The identityAckP1 header includes a confirmation that the encoding device is registered with the exchange service and that the current master key can be used. Once a master key has been established between the encoding device and the exchange service and until it is revoked, the request blob will not include "identityP1" nor "identityAckP1".

The supply component information may include data to be decrypted by the exchange service. In some examples, the supply component information may include structured and potentially unstructured data. For instance, a top level protocol (e.g., structured data) may be used, regardless of what type of supply component is reprocessed, with other unstructured data added to the top level protocol to complete a request blob.

The supply component information may be formatted in a particular data format. For instance, the supply component information may be formatted as a JavaScript Object Notation (JSON) object and expressed as a string. The individual attributes in the object may be expressed as American Standard Code for Information Interchange (ASCII) strings, the interpretation of which may be agreed upon based on the data encoded. Examples are not so limited, however, and attributes in the object (e.g., the supply component information) may be expressed as hexadecimal strings, decimal integers, or any other format. While various examples of the present disclosure describe formatting blobs using JSON, examples are not so limited. Any number of data formats may be used including CSV, xml, html, and C #, among others.

The supply component information of the request blob may include a plurality of different attributes, each of which is formatted in a particular data format. As a non-limiting example, the supply component information may include a version, device information, a unique identifier for the supply component, a request diversifier, a counter, a platform, a chip schema identifier, supply data, and a previous status.

The version attribute includes a string representing the version of the data blob structure of the format "1.X." In some examples, the version is written in ASCII string, though examples are not so limited. The device information attribute includes a structure within the blob to describe the metadata surrounding the encoding device. The device information may be written as a JSON object, though examples are not so limited. Non-limiting examples of attributes of the device information include device unique identifier, a firmware version, a serial number, and a product number. The device unique identifier attribute may include a unique identifier for the encoding device generating the request. This may be a hardware security identifier or some other identifier than can be used to track an encoding device over time. The device unique identifier may be formatted as a hexadecimal string. The firmware version attribute may include a version of the firmware running on the encoding device and may be formatted as an ASCII string. The serial number attribute may include a reported serial number of the encoding device, and may be formatted as an ASCII string. The product number attribute may include a product SKU number for the encoding device, and may be formatted as an ASCII string.

The unique identifier for the supply component includes a supply identifier for a given platform. For instance, a particular supply component may have a first supply identifier for use with an inkjet printing platform, and a second supply identifier for use with a laser printing platform. The unique identifier for the supply component may be expressed as an ASCII string, though examples are not so limited. The request diversifier attribute may include an arbitrary decimal integer that is different between multiple requests. The request diversifier may be a timestamp, a counter, or a blend of other data, but is unique between requests. The counter attribute includes a number of times that the supply component has previously been reprocessed, and may be provided by the supply component. In various examples, the counter attribute is expressed as a decimal integer.

The platform attribute may be used to identify the technology the supply data is encoded in, and therefore the general format of the supply component data. The platform attribute may be written as an ASCII string, and include an indication of the type of technology. For instance, the platform attribute may include a first notation type to indicate that the supply component is for inkjet printing, and the supply component data is written for an inkjet printer. As another example, the platform attribute may include a second notation type to indicate that the supply component is for laser printing, and the supply component data is written for a laser printer.

The chip schema identifier may be used to indicate a template that the exchange service will use to decode the data in the request blob. Put another way, for a given chip type, a codex may be used to ingest the data. Within the platform, the chip schema identifier may indicate what template or set of templates to choose from when decoding the supply data. In various non-limiting examples, the chip schema identifier may be written as a decimal integer.

The supply data attribute may be platform and product specific. For instance, ink products populate data specific for an inkjet platform, and laser products populate data specific for a laser printing platform. Within each of these is a platform-specific structure, described below. One type of supply data attribute may be present in the blob. The supply data attribute may be formatted as a JSON object, though examples are not so limited.

The previous status attribute may include an acknowledgement of a previous supply's successful reprocessing. Put another way, a request blob may include an acknowledgement of successful receipt and encoding of a previous response blob. The previous status attribute may be formatted as a JSON object. Attributes of the previous status include a unique identifier for the previously reprocessed supply component, a request diversifier for the previously reprocessed supply component, and a reprocessing status for the previously reprocessed supply component.

As described above, the unique identifier for the previously reprocessed supply component includes a supply identifier for a given platform. For instance, a particular supply component may have a first supply identifier for use with an inkjet printing platform, and a second supply identifier for use with a laser printing platform. The unique identifier for the previously reprocessed supply component may be expressed as an ASCII string, though examples are not so limited. The request diversifier for the previously reprocessed supply component attribute includes an arbitrary decimal integer that is different between multiple requests. The reprocessing status for the previously reprocessed supply component includes a status mapping into an error code table that reflects whether or not the previous response blob was reprocessed.

As described herein, the supply data attribute of a supply component object may be platform and product specific. For instance, ink products populate data specific for an inkjet platform, and laser products populate data specific for a laser printing platform. Within each of these is a platform-specific structure. For instance, attributes of an inkjet supply data object may include a template major, a base key table, a data store, a challenge length, and partition data. The template major includes an integer representing the template version. The base key table attribute, data store attribute, and challenge length attributes may include a Base64String that is used for signature validation. The partition data attribute may include raw partitions from the supply memory device. Data contained in the partition data attribute may be parsed with a corresponding supply template, which can be looked up using the chip schema identifier and template version.

Attributes of a laser supply data object may include cryptographic elements, a last used date, an install date, protected, reused, and count. The cryptographic elements attribute includes cryptographic elements and/or digital signatures to establish trust and may in some examples be formatted as a 192 Byte string. The last used date attribute may include a date when the supply was last used and may be formatted as 4 Bytes as a date code. The install date may include an immutable install date of the cartridge, which may be blank in certain circumstances. The install date may be formatted as 4 Bytes as a date code. The protected property attribute may include data on if an anti-theft protection feature was activated by the user for the corresponding supply component. The protected property attribute may be formatted as a 2 Byte integer. If the protected property attribute is 0 that indicates that the supply component was not protected. The reused attribute may include data showing that the supply component is reused. The reused attribute may be formatted as a 1 Byte integer. The count attribute may include an indication for the number of reprocessing events the supply component has experienced, as reported by the exchange service. The count attribute may be expressed as a Base64 encoded bit field. Other attributes may be included in the laser supply data object. For instance, different and/or additional attributes that include usage history data and/or feature settings may be included.

At 103, the method 100 further includes extracting from the request blob, a supply identifier and raw supply data, in response to cryptographically verifying the request blob. For instance, the method 100 may include decoding the raw supply data in the request blob, by locating a template version selector using the supply identifier. As described herein, the chip schema identifier may be used to indicate a template that the exchange service will use to decode the data in the request blob. The chip schema identifier may indicate what template or set of templates to choose from when decoding the supply data.

Figure 2:
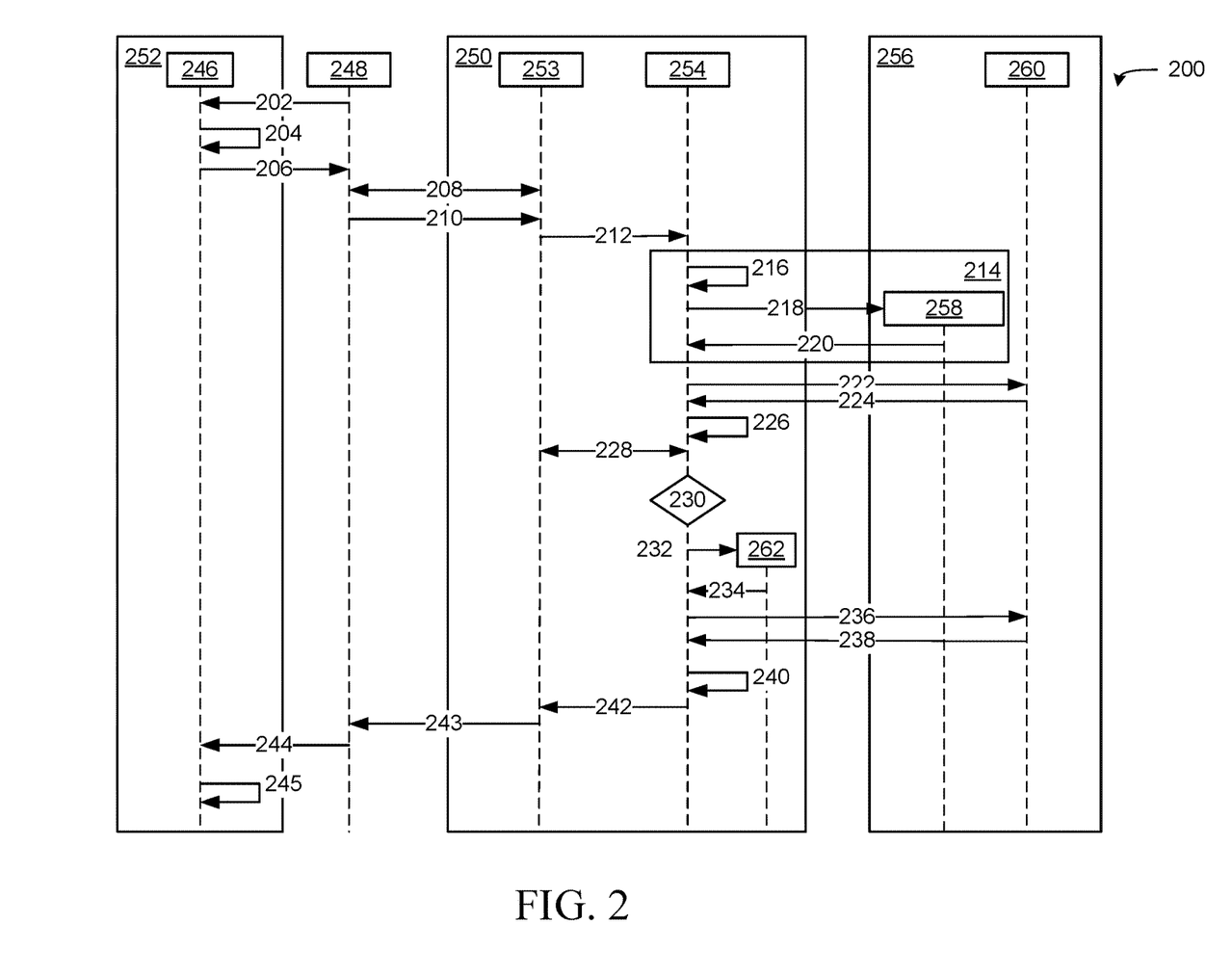
FIG. 2 illustrates an example method for reprocessing of a replaceable supply component, in accordance with the present disclosure.

As described more thoroughly with regards to FIG. 2, the exchange service may cryptographically verify the request blob using a variety of encryption keys. In some examples, the method 100 includes extracting from the request blob, an identity envelope, and decrypting a payload from the request blob responsive to acknowledgement of the identity envelope.

At 105, the method 100 includes using the supply identifier and raw supply data, generating a reprocess structure to append or amend original manufacturing data for the replaceable supply component. In some examples, generating the reprocess structure includes resetting a fill level, a manufacturer identifier or a reprocess cycle counter of the reprocessed supply component. As used herein a reprocess structure refers to or includes reprocessing instructions provided by the exchange service to the encoding device.

At 107, the method 100 further includes providing a response blob to the encoding device, to designate the replaceable supply component as a reprocessed supply component. In various examples, the response blob is cryptographically signed using a KDF derived key, as described further with regards to FIG. 2. The payload encryption and signing may be based on Authenticated Encryption with AES128-GCM, and the encryption key may rotate with every payload.

In various examples, the response blob is provided to the encoding device for reprocessing of the replaceable supply component. As the process described herein may be performed in a web-based system or without a network connection, the method 100 may include providing the response blob for copy and paste in web browser, and/or providing the response blob to the encoding device directly via a network connection.

FIG. 2 illustrates an example method 200 for reprocessing of a replaceable supply component, in accordance with the present disclosure. FIG. 2 illustrates a time-lapse sequence of communication between an encoding device 252, a user 248, and an exchange service 250.

At 202, the method 200 includes a user 248, via a browser, sending a query for information about the replaceable supply component to an exchange service component 246 of the encoding device 252. At 204, the method 200 includes the exchange service component 246 of the encoding device 252 creating the request blob. As described with regards to FIG. 1, the request blob includes the supply component information in the request blob content, and an identity envelope in the request blob header. Once the request blob is created by the exchange service component 246 of the encoding device 252, the request blob is provided for the user 248 at 206. The user 248 may copy and paste the request blob into a browser for the exchange service component 254. In some examples, the encoding device 252 sends the request blob directly to the exchange service component 254.

In various examples, the method 200 includes the user 248 logging into the exchange service 250 at 208, and forwarding the request blob to the exchange service 250 at 210. Although FIG. 2 illustrates the user logging in at step 208 (e.g., after the request blob has been generated), examples are not so limited. The user may login to the exchange service 250 at any point during runtime. As illustrated in FIG. 2, the exchange service 250 may include a plurality of components. For instance, the exchange service 250 may include a user account component 253 which assists with user account management, a signing service component 254 which assists with generation of encryption keys for secure receipt and transmission of communications, and a hardware security module 262.

At 210, the user 248 provides to the exchange service 250, the request blob. At 212, the user account component 253 of the exchange service 250 forwards the request blob to the signing service component 254 of the exchange service 250. In response to receipt of the request blob, the signing service component initiates a master key setup process 214. The master key setup process 214 begins with the signing service component 254 extracting the identity envelope from the JOSE header of the request blob at 216.

The exchange service 250 may work in collaboration with an encryption service 256, as well as a KDF derived key service 260, to securely decrypt request blobs and encrypt response blobs. At 218, the signing service component 254 of the exchange service 250 sends to a device registration component 258 of the encryption service 256, the identity envelope at 216. KDF derived keys, used at various points in sending and receiving blobs, rely on a master key. Key establishment may be performed by registering the encoding device with the encryption service 256. The device registration component 258 of the encryption service 256 replies at 220 with an envelope payload called "entity_config". This envelope may be provided back to the encoding device in the "identityAckP1" property of the response blob. After the encoding device is registered, the exchange service 250 may query the encryption service 256 for KDF derived keys.

After the identity of the encoding device is confirmed at 220, the method 200 continues with the signing service component 254 of the exchange service 250 sending a request 222 to the KDF derived key service 260 of the encryption service 256. Because the master key was generated at 214, the KDF derived key service 260 of the encryption service 256 responds at 224 with a KDF derived key sent to the signing service component 254.

In response to receipt of a KDF derived key from the KDF derived key service 260, the signing service component 254 of the exchange service 250 decrypts the request blob to extract the supply component information at 226. As the previous steps included a user log in, identification of the encoding device, and identification of the supply component to be reprocessed, the method 200 includes checking account permissions at 228. Checking account permissions may include identifying if the individual user is granted authority to reprocess supply components. In some examples, the account permissions may include identifying if the particular encoding device is authorized to reprocess supply components, and/or identifying if the particular supply component may be reprocessed. Examples are not limited to those enumerated, and checking account permissions at 228 may include any operation to identify if the reprocessing request of the request blob may be fulfilled. To check account permissions, the signing service component 254 of the exchange service 250 may query (at 228) the user account component 253 of the exchange service 250.

If the user account component 253 of the exchange service 250 responds with an indication that the request blob may not be fulfilled, an error blob may be generated. Error blobs are discussed more thoroughly with regards to FIG. 4. If the user account component 253 of the exchange service 250 responds with an indication that the request blob may be fulfilled, the signing service component 254 of the exchange service 250 processes the supply component information included in the request blob, and generates reprocessing instructions that will be included in the response blob, at 230.

The response blob may include a plurality of attributes, each attribute being of a JSON data type. As described herein, examples are not limited to the JSON data format, and other data formats may be used. In some examples, the reprocessing instructions append or amend data in non-volatile memory of the replaceable supply component to designate the replaceable supply component as a reprocessed supply component. The reprocessing instructions of the response blob include the same architecture as the request blob, and are specific for the type of supply component that is being reprocessed. For instance, if the supply component is an ink cartridge, the response blob includes a plurality of properties, which include signature data, write partition, and host provided data file. The signature data property includes a data block containing the reprocessing schema, a key ID, and a signature. The write partition property includes a binary representation of the raw data that needs to be written to the ink cartridge supply component. The host provided data file property includes one or more host provided data file blocks, as defined by the host provided data file specification. This parameter is optional as host provided data file functionality becomes available on the different platforms.

If the supply is a laser supply component, the laser reprocess data may include a plurality of properties. For instance, the laser reprocess data may include a count attribute that is represented on the supply component as a 3 bit field with each set bit indicating a remanufacture cycle. Other attributes may be included in the laser reprocess data. For instance, different and/or additional attributes that include a fill level, a number of reprocessing cycles, as well as a digital signature attribute may be included.

When describing the data to write back to the supply, the response blob may indicate what data is written to the supply component, as well as where on the supply component memory it should be written. The format of the write block may vary between technology platforms, but one option may look like the following: address1||length1||data1||address2||length2||data2|| . . . .

Following generation of the reprocessing instructions at 230, the signing service component 254 of the exchange service 250 sends a request 232 to a hardware security module 262. The hardware security module 262 is where the signature for the response blob is generated. The hardware security module 262 responds to the signing service component 254 with a signature at 234. In response, the signing service component 254 sends a request to the KDF derived key service 260 for a KDF derived key. At 238, the KDF derived key service 260 sends a KDF derived key to the signing service component 254. The KDF derived key sent at 238 is different from the KDF derived key sent at 224.

Once the reprocessing instructions have been signed (at 234) packaged in an envelope, at 240. As described herein, the envelope of the response blob may include a header and a payload, and in some examples may be a JSON web exchange (JWE) data structure. The header may include a description of the cryptographic operations and parameters employed by the blob. In various examples, the header is a JOSE (JSON Object Signing and Encryption) header. The payload of the request blob includes the message to be secured, e.g., the reprocessing information to be sent to the encoding device.

As described with regards to FIG. 1, the parameters of the JOSE header may include zip, jti, iat, exp, kid, identityP1, and identityAckP1. The "kid" attribute refers to a key ID. The kid attribute in the JOSE header may change based on whether the message is going from the encoding device to the exchange service, or from the exchange service to encoding device. For communications from the encoding device to the exchange service, the kid attribute in the JOSE header follows the format:

```
com.hp.cdm.platform.avatar # CRLF added for readability
 .keyType.otp_hkdf_sha2_aes128
 .masterKeyId.<base64URL of Envelope Master Key ID>
 .deviceProduct unique ID.<lowercase hyphenated device
PRODUCT UNIQUE ID> .serviceName.svc_supply_encoding
 .keyIndex.<KDF key index>
```

The masterKeyId attribute may be generated by the firmware of the encoding device, during the Identity Envelope generation (as discussed with regards to FIG. 2), and may be Base64URL encoded. The deviceProduct unique ID attribute may be a unique identifier for the encoding device, and may be lowercase and hyphenated. The serviceName attribute is "svc_supply_encoding". The keyIndex may be an incrementing index to generate one time AES keys. As communications from the encoding device to the exchange service, and from the exchange service to the encoding device, both utilize a key index, the key indexes for encoding device to the exchange service communications increment independently from key indexes for exchange service to the encoding device communications.

For exchange service to the encoding device communications, the kid attribute in the JOSE header follows the format:

```
com.hp.cdm.platform.avatar # CRLF added for readability
 .keyType.otp_hkdf_sha2_aes128
 .masterKeyId.<base64URL of Envelope Master Key ID>
 .serviceName.svc_supply_encoding
 .deviceProduct unique ID.<lowercase hyphenated device
PRODUCT UNIQUE ID>
 .keyIndex.<KDF key index>
```

As with the kid attributes for communications from the encoding device to the exchange service, the masterKeyId attribute may be generated by the firmware of the encoding device, during the Identity Envelope generation (as discussed with regards to FIG. 2), and may be Base64URL encoded. The deviceProduct unique ID attribute may be a unique identifier for the encoding device, and may be lowercase and hyphenated. The serviceName attribute is "svc_supply_encoding". The keyIndex may be an incrementing index to generate one time AES keys. As communications from the encoding device to the exchange service, and from the exchange service to the encoding device, both utilize a key index, the key indexes for encoding device to the exchange service communications increment independently from key indexes for exchange service to the encoding device communications.

After the reprocessing instructions have been packaged at 240, the signing service component 254 sends the packaged response blob to the user account component 253, at 242. An indication that the response blob has been received may be displayed on a user interface for the user 248, or another form of notification may be provided to user 248, at 243. As described herein, the exchange service 250 may provide the response blob directly to the encoding device 252, in some examples.

At 244, the user 248 provides to the exchange service component 246 of the encoding device 252, the response blob received from the exchange service 250. At 245, the exchange service component 246 of the encoding device 252 decrypts the response blob. Once the response blob has been decrypted by the exchange service component 246 of the encoding device 252, the reprocessing instructions may be sent to the replaceable supply component.

Figure 3:
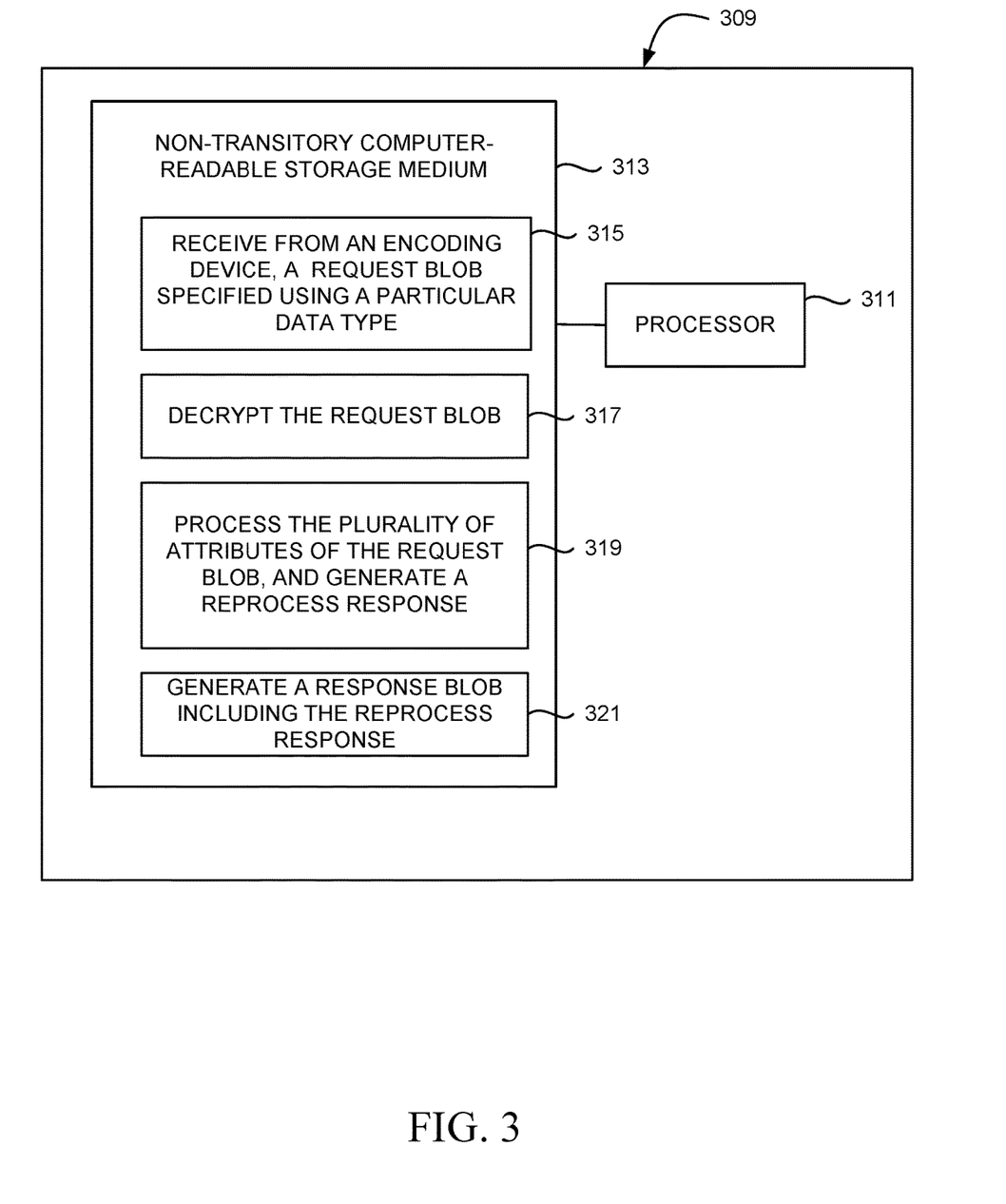
FIG. 3 illustrates an example block diagram of a computing device including instructions for reprocessing of a replaceable supply component, in accordance with the present disclosure.

FIG. 3 illustrates an example block diagram of a computing device 309 including instructions for reprocessing of a replaceable supply component, in accordance with the present disclosure. As illustrated in FIG. 3, the computing device 309 may include a processor 311, and a computer-readable storage medium 313. The computing device 309 may perform the operations of the exchange service 250, as well as the operations of the encryption service 256, illustrated in FIG. 2. As such, the computing device 309 may perform the method 100 illustrated in FIG. 1, as well as method 200 illustrated in FIG. 2.

The processor 311 may be a central processing unit (CPU), a semiconductor-based microprocessor, and/or other hardware device suitable to control operations of the computing device 309. Computer-readable storage medium 313 may be an electronic, magnetic, optical, or other physical storage device that contains or stores executable instructions. Thus, computer-readable storage medium 313 may be, for example, Random Access Memory (RAM), an Electrically Erasable Programmable Read-Only Memory (EEPROM), a storage device, an optical disc, etc. In some examples, the computer-readable storage medium may be a non-transitory storage medium, where the term 'non-transitory' does not encompass transitory propagating signals. As described in detail below, the computer-readable storage medium 313 may be encoded with a series of executable instructions 315-321.

As illustrated, the computer-readable storage medium 313 may store instructions 315 that, when executed, cause the computing device 309 to receive from an encoding device, an envelope including a request blob specified using a particular data type, the request blob having a plurality of attributes, each attribute being of the predetermined data type and including a request to reprocess a replaceable supply component.

The computer-readable storage medium 313 may store instructions 317 that, when executed, cause the computing device 309 to decrypt the envelope, in response to establishing a key with the encoding device using a KDF derived key.

The computer-readable storage medium 313 may store instructions 319 that, when executed, cause the computing device 309 to process the plurality of attributes of the request blob. The computer-readable storage medium 313 may store instructions 321 that, when executed, cause the computing device 309 to generate a reprocess response corresponding to the processed request blob. As described herein, the response blob may include the reprocess response (also referred to herein as the "reprocessing instructions") and designating the replaceable supply component as a reprocessed supply component. In various examples, the response blob may include a plurality of attributes, each attribute being of the predetermined data type. For instance, the plurality of attributes of the response blob may include a device identifier for the encoding device, a supply component identifier, and a reprocess counter.

In various examples, the plurality of attributes of the response blob include reprocess data formatted based on a type of the supply component. For instance, a first format of reprocess data may be provided if the supply component is for a first type of technology, and a second format of reprocess data may be provided if the supply component is for a second type of technology.

As discussed with regards to FIG. 1 and FIG. 2, when the supply component is a laser toner cartridge, the plurality of attributes of the response blob may include reprocess data comprising a fill level of the reprocessed toner cartridge. When the supply component is an inkjet supply, the plurality of attributes of the response blob may include reprocess data comprising supply manufacturing and usage data as formatted on the supply component, and additional data for validating digital signatures.

Figure 4:
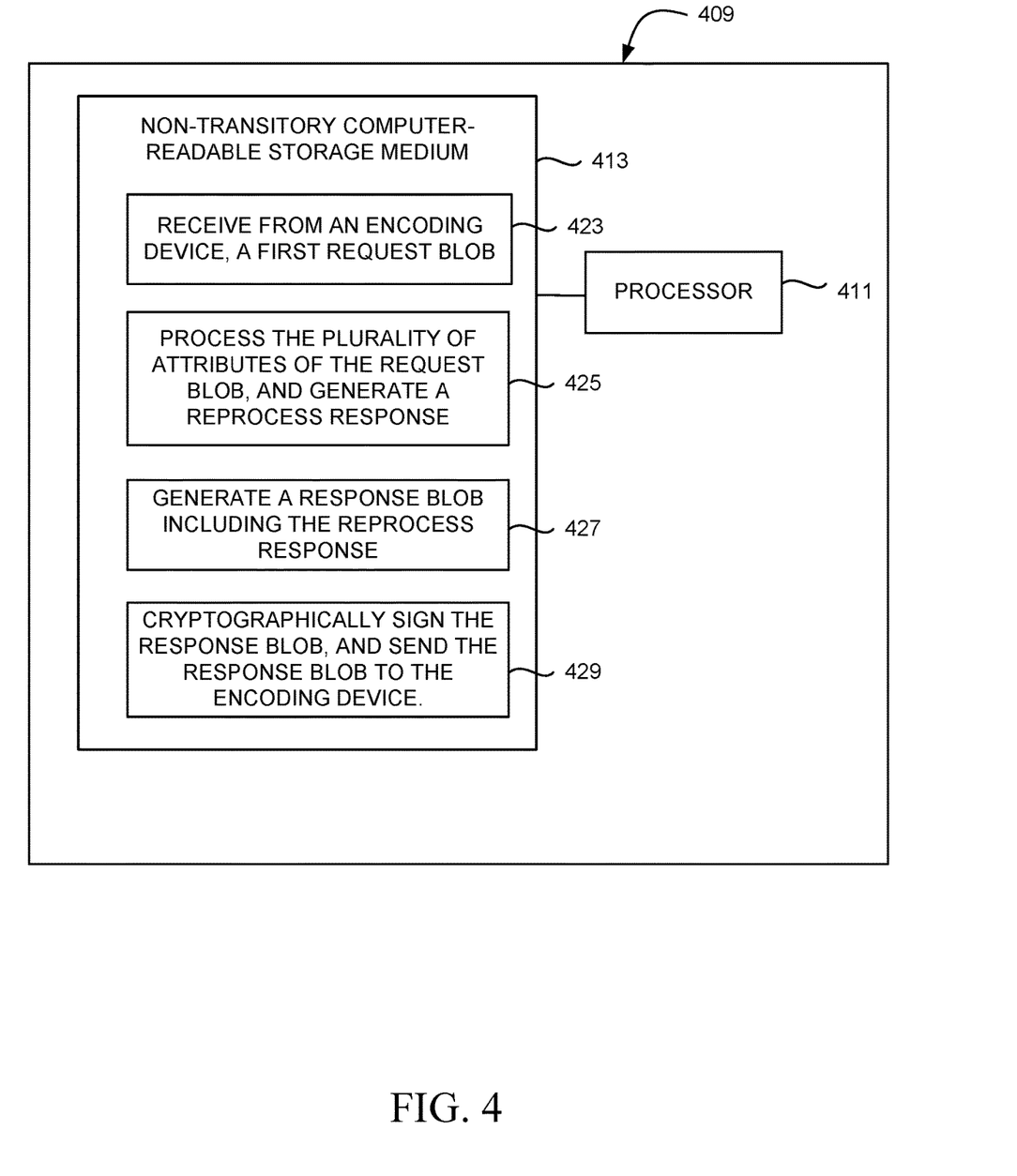
FIG. 4 illustrates an example block diagram of a computing device including instructions for reprocessing of a replaceable supply component, in accordance with the present disclosure.

FIG. 4 illustrates an example block diagram of a computing device 409 including instructions for reprocessing of a replaceable supply component, in accordance with the present disclosure. As illustrated in FIG. 4, the computing device 409 may include a processor 411, and a computer-readable storage medium 413. The computing device 409 may be similar to the computing device 309 illustrated in FIG. 3, and may perform the operations of the exchange service 250, as well as the operations of the encryption service 256, illustrated in FIG. 2. As such, the computing device 409 may perform the method 100 illustrated in FIG. 1, as well as method 200 illustrated in FIG. 2.

The processor 411 may be a central processing unit (CPU), a semiconductor-based microprocessor, and/or other hardware device suitable to control operations of the computing device 409. Computer-readable storage medium 413 may be an electronic, magnetic, optical, or other physical storage device that contains or stores executable instructions. Thus, computer-readable storage medium 413 may be, for example, Random Access Memory (RAM), an Electrically Erasable Programmable Read-Only Memory (EEPROM), a storage device, an optical disc, etc. In some examples, the computer-readable storage medium may be a non-transitory storage medium, where the term 'non-transitory' does not encompass transitory propagating signals. As described in detail below, the computer-readable storage medium 413 may be encoded with a series of executable instructions 423-429.

As illustrated, the computer-readable storage medium 413 may store instructions 423 that, when executed, cause the computing device 409 to receive from an encoding device, a first envelope including a request blob specified using JavaScript Object Notation (JSON), the request blob having a plurality of attributes, each attribute being of a predetermined JSON data type and including a request to reprocess a supply component. The computer-readable storage medium 413 may store instructions 425 that, when executed, cause the computing device 409 to process the plurality of attributes of the request blob, and generate a reprocess response corresponding to the processed request blob. The computer-readable storage medium 413 may store instructions 427 that, when executed, cause the computing device 409 to generate a response blob including the reprocess response and designating the supply component as a reprocessed supply component, the response blob having a plurality of attributes, each attribute being of a JSON data type. As described at various points herein, JSON is used for discussion purposes but does not limit examples of the present disclosure to implementations using JSON. Any number of data formats may be used including CSV, xml, html, and C#, among others.

The computer-readable storage medium 413 may store instructions 429 that, when executed, cause the computing device 409 to cryptographically sign the response blob, and send a second envelope including the response blob to the encoding device. As described herein, the response blob may append or amend data in a memory chip of the replaceable supply component to designate the replaceable supply component as a reprocessed supply component.

As described with regards to FIG. 2, the computer-readable storage medium 413 may store instructions that, when executed, cause the computing device 409 to, in response to establishing a key with the encoding device using a first KDF derived key, decrypt the received envelope, and cryptographically sign the response blob using a second KDF derived key.

In some examples, the request blob received may include an acknowledgement of successful receipt and encoding of a previous response blob. In some examples, a previous response blob may not be successfully processed. As such, the computer-readable storage medium 413 may store instructions that, when executed, cause the computing device 409 to generate an error blob for the encoding device including a description of an error encountered. For instance, the response blob may include an error identifier. The response blob may include an indication of an error, rather than reprocessing data for the supply component. The error blob may be subject to the same encapsulation methods used for the request and response blobs. The format for the error object includes a version, a device unique identifier, a unique identifier for the supply component, an original request diversifier, an error diversifier, an error status, and raw error data.

The version attribute includes a string representing the version of the error blob structure of the format "1.X". The unique identifier includes a unique identifier for the encoding device generating the request. This may be a Hardware security identifier or some other identifier than can be used to track a single encoding device over time. The unique identifier for the supply component includes an identifier for the supply component that is appropriate for the given platform. This may be different between inkjet products and laser printing products. The original request diversifier includes the request diversifier attribute of the request blob or response blob encountering an error on the encoding device. The error diversifier includes an approximate number of seconds since 1970 that this error blob was generated, or a counter of the number of error messages sent, which may allow for differentiation of otherwise duplicate blobs. The error status includes an encoding of the failure encountered that generated this blob. And the raw error data includes any error-related data a firmware developer may find useful for debugging issues with the encoding device. This error-related data may vary between platforms and products, and in some instances may be left blank.

Error codes may be shared across product platforms and families, so a common enumeration may be used to identify an error type. Various errors may include but are not limited to 'ok', 'badSignature', 'wrongConsumable', 'wrongRequest', 'failedWrite', 'missingSupply', 'failedRead', 'noEngineResponse', 'attributeMismatch', 'unknownEngine', 'remanDataVerificationFailed', 'remanDataParsingError', and 'remanDataInvalid'. The ok error indicates no error was identified, data was unwrapped and written to the correct supply component successfully. The badSignature error indicates the received response blob could not be authenticated. The wrongConsumable error indicates that the received blob was not intended for the currently inserted supply component. The wrongRequest error indicates that the received blob was intended for the supply component but had the wrong request diversifier. The failedWrite error indicates that the attempt to write the remanWriteBlocks failed and could not be recovered. The missingSupply error indicates that the attempt to read or write data failed because no supply was found to communicate with. The failedRead error indicates that the attempt to read data from the supply failed, although the supply can be detected. The noEngineResponse error indicates that the formatter-side cloud communication application has not received a response from the engine. The attributeMismatch error indicates that the received response blob did not contain the same supply and device identification data as the initial request. The unknownEngine error indicates that the engine encountered an error not described above. The remanDataVerificationFailed error indicates that an error was encountered decrypting the response blob. The remanDataParsingError error indicates that an error occurred parsing the response blob schema. The remanDataInvalid error indicates that an attribute in the response blob doesn't meet some expectation, such as a maximum number of allowed reprocessing events for this supply has been exceeded.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:
   receiving from an encoding device and using an interface communicatively coupled to the encoding device, a request blob to reprocess a replaceable supply component;
   in response to cryptographically verifying the request blob, extracting from the request blob, a supply identifier and raw supply data;

using the supply identifier and raw supply data, generating a reprocess structure to append or amend original manufacturing data for the replaceable supply component; and providing a response blob to the encoding device, to designate the replaceable supply component as a reprocessed supply component.

2. The method of claim 1, wherein generating the reprocess structure includes resetting a fill level, a manufacturer identifier or a reprocess cycle counter of the reprocessed supply component.

3. The method of claim 1, further including decoding the raw supply data in the request blob, by locating a template version selector using the supply identifier.

4. The method of claim 1, including extracting from the request blob, an identity envelope.

5. The method of claim 4, including decrypting a payload from the request blob responsive to acknowledgement of the identity envelope.

6. The method of claim 1, wherein the request blob includes an acknowledgement of successful receipt and encoding of a previous response blob.

7. A non-transitory computer-readable storage medium comprising instructions that when executed cause a computing device to:

receive from an encoding device, a request blob specified using a particular data type, the request blob having a plurality of attributes, each attribute being of the particular data type and including a request to reprocess a replaceable supply component;

in response to establishing a key with the encoding device using a key derivation function (KDF) derived key, decrypt the request blob;

process the plurality of attributes of the request blob, and generate a reprocess response corresponding to the processed request blob; and generate a response blob including the reprocess response and designating the replaceable supply component as a reprocessed supply component, the response blob having a plurality of attributes, each attribute being of the particular data type.

8. The non-transitory computer-readable storage medium of claim 7, wherein the plurality of attributes of the response blob include a device identifier for the encoding device, a supply component identifier, and a reprocess counter.

9. The non-transitory computer-readable storage medium of claim 7, wherein the plurality of attributes of the response blob include reprocess data formatted based on a type of the supply component.

10. The non-transitory computer-readable storage medium of claim 7, wherein the supply component is a laser toner cartridge, the plurality of attributes of the response blob including reprocess data comprising a fill level of the reprocessed toner cartridge.

11. The non-transitory computer-readable storage medium of claim 7, wherein the supply component is an inkjet supply, the plurality of attributes of the response blob including reprocess data comprising supply manufacturing and usage data as formatted on the supply component.

12. A non-transitory computer-readable storage medium comprising instructions that when executed cause a computing device to:

receive from an encoding device, a first request blob specified using JavaScript Object Notation (JSON), the request blob having a plurality of attributes, each attribute being of a JSON data type and including a request to reprocess a supply component;

process the plurality of attributes of the request blob, and generate a reprocess response corresponding to the processed request blob;

generate a response blob including the reprocess response and designating the supply component as a reprocessed supply component, the response blob having a plurality of attributes, each attribute being of a JSON data type; and cryptographically sign the response blob, and send the response blob to the encoding device.

13. The non-transitory computer-readable storage medium of claim 12, including instructions that when executed, cause the computing device to generate an error blob for the encoding device including a description of an error encountered.

14. The non-transitory computer-readable storage medium of claim 12, including instructions that when executed, cause the computing device to in response to establishing a key with the encoding device using a first key derivation function (KDF) derived key, decrypt an envelope, and cryptographically sign the response blob using a second KDF derived key.

15. The non-transitory computer-readable storage medium of claim 12, wherein the request blob includes an acknowledgement of successful receipt and encoding of a previous response blob.

* * * * *